United States Patent
Liu et al.

(10) Patent No.: US 12,110,423 B2
(45) Date of Patent: Oct. 8, 2024

(54) INORGANIC ADHESIVE FOR PREVENTING CRACKS OF BAMBOO PRODUCTS, PREPARATION METHOD OF INORGANIC ADHESIVE, AND PREPARATION METHOD OF BAMBOO SCRIMBER

(71) Applicants: Shandong Jianzhu University, Jinan (CN); Engineering Research Institute of Appraisal and Strengthening of Shandong Jianzhu University, Jinan (CN); Shandong Jiangu Special Engineering Co., Ltd., Jinan (CN)

(72) Inventors: Qiaoling Liu, Jinan (CN); Xin Zhang, Jinan (CN); Liudong Jia, Jinan (CN); Xiurong Li, Jinan (CN)

(73) Assignees: Shandong Jianzhu University, Jinan (CN); Engineering Research Institute of Appraisal and Strengthening of Shandong Jianzhu University, Jinan (CN); Shandong Jiangu Special Engineering Co., Ltd., Jinan (CN)

( * ) Notice: Subject to any disclaimer, the term of this patent is extended or adjusted under 35 U.S.C. 154(b) by 567 days.

(21) Appl. No.: 17/464,719

(22) Filed: Sep. 2, 2021

(65) Prior Publication Data
US 2021/0395570 A1 Dec. 23, 2021

Related U.S. Application Data

(63) Continuation-in-part of application No. PCT/CN2020/000276, filed on Nov. 11, 2020.

(30) Foreign Application Priority Data

Mar. 30, 2020 (CN) .......................... 202010239326.5

(51) Int. Cl.
| | |
|---|---|
| *C09J 1/02* | (2006.01) |
| *C08K 5/092* | (2006.01) |
| *C08K 7/02* | (2006.01) |
| *C08L 1/02* | (2006.01) |
| *C08L 23/08* | (2006.01) |
| *C09J 11/06* | (2006.01) |
| *C08K 3/22* | (2006.01) |
| *C08K 5/5353* | (2006.01) |

(52) U.S. Cl.
CPC ................. *C09J 1/02* (2013.01); *C08K 5/092* (2013.01); *C08K 7/02* (2013.01); *C08L 1/02* (2013.01); *C08L 23/0853* (2013.01); *C09J 11/06* (2013.01); *C08K 2003/222* (2013.01); *C08K 5/5353* (2013.01); *C08K 2201/011* (2013.01)

(58) Field of Classification Search
CPC ....... C04B 28/30; C04B 18/146; C04B 12/04; C04B 24/06; C04B 28/383; C04B 2103/0057; C04B 24/003; C04B 18/265; C04B 2201/50; C04B 2201/52; C09J 1/02; C09J 11/06; C09J 101/02; C08K 5/092; C08K 5/5353; C08K 2003/222; C08L 1/02; C08L 23/0853
See application file for complete search history.

(56) References Cited

U.S. PATENT DOCUMENTS

2018/0162777 A1* 6/2018 White .................... C04B 28/04

OTHER PUBLICATIONS

Ruan et al. (Experimental Study of New Magnesia Cement Material), Wang (Study on Epoxy resin Adhesive Modified by Micro-nano fibrils) (Year: 2009).*
Huang et al. Preparation and properties of silicon magnesium cement with bamboo particle board (Year: 2018).*
Wang (Study on Epoxy resin Adhesive Modified by Micro-nano fibrils), (Year: 2016).*

* cited by examiner

*Primary Examiner* — Ling Siu Choi
*Assistant Examiner* — Olga Lucia Donahue
(74) *Attorney, Agent, or Firm* — MATTHIAS SCHOLL P.C.; Matthias Scholl

(57) ABSTRACT

An inorganic adhesive includes magnesium oxide, magnesium sulfate heptahydrate, silica fume, silica sol, lithium silicate, sodium silicate, citric acid, microcrystalline cellulose, cellulose nanowhiskers, amino trimethylene phosphonic acid, and water.

11 Claims, No Drawings

INORGANIC ADHESIVE FOR PREVENTING CRACKS OF BAMBOO PRODUCTS, PREPARATION METHOD OF INORGANIC ADHESIVE, AND PREPARATION METHOD OF BAMBOO SCRIMBER

CROSS-REFERENCE TO RELATED APPLICATIONS

This application is a continuation-in-part of International Patent Application No. PCT/CN2020/000276 with an international filing date of Nov. 11, 2020, designating the United States, now pending, and further claims foreign priority benefits to Chinese Patent Application No. 202010239326.5 filed Mar. 30, 2020. The contents of all of the aforementioned applications, including any intervening amendments thereto, are incorporated herein by reference. Inquiries from the public to applicants or assignees concerning this document or the related applications should be directed to: Matthias Scholl P C., Attn.: Dr. Matthias Scholl Esq., 245 First Street, 18th Floor, Cambridge, MA 02142.

BACKGROUND

The disclosure relates to the field of adhesives for bamboo materials, and more particularly, to an inorganic adhesive for preventing cracks of bamboo products, a preparation method of the inorganic adhesive, and a preparation method of a bamboo scrimber.

Bamboo and wood are environmentally friendly materials. The growth period of bamboo is less than that of wood while the tensile strength thereof is higher than wood. Nowadays, the use of bamboo has become more important because the timber as a construction material is dwindling quickly. However, round bamboo has some disadvantages, such as small section, low bearing capacity, easiness to be eaten by insects, corrosion and so on. Glue-laminated bamboo is an engineer bamboo product with larger section and higher load bearing capacity. The glue-laminated bamboo includes laminated bamboo (glued bamboo strips) and bamboo scrimber (impregnated bamboo silk). The bamboo scrimber has good integrity and high load bearing capacity, and the preparation thereof involves large amount of organic adhesive. During production, the organic adhesive releases a large amount of harmful substances, such as phenol and aldehyde. In addition, the organic adhesive has poor durability and fire resistance, which limits the application and service life of the bamboo structure.

Ordinary inorganic adhesive does not release harmful substances and has good durability and fire resistance. However, ordinary inorganic adhesive cannot bond firmly with bamboo materials. Compared with organic adhesive, the components bonded with inorganic adhesive has an increased risk of cracking and a high rate of defects that cannot be used in bamboo structures and bamboo products.

SUMMARY

The disclosure provides an inorganic adhesive for preventing cracks of bamboo products, a preparation method of the inorganic adhesive, and a preparation method of a bamboo scrimber.

The inorganic adhesive for preparing a bamboo scrimber from impregnated bamboo silk has good adhesion and permeability. In the disclosure, magnesium oxysulfide is modified as a base material and exhibits higher adhesion and permeability to bamboo materials, and thus the prepared bamboo scrimber features ultra-high fire resistance and high strength.

The inorganic adhesive comprises magnesium oxide, magnesium sulfate heptahydrate, silica fume, silica sol, lithium silicate, sodium silicate, citric acid, microcrystalline cellulose, cellulose nanowhiskers, amino trimethylene phosphonic acid, and water.

In a class of this embodiment, the inorganic adhesive further comprises redispersible latex powder.

The following are explanations of the components of the inorganic adhesive:

Magnesium oxide: light-burned magnesia, with an activity of 58 or above; the higher the activity, the higher the strength of hydration products.

Magnesium sulfate heptahydrate: industrial grade, with an effect content of ≥90%; the higher the effective content is, the higher the strength of hydration products is.

Silica fume: with $SiO_2$ content >90%, a particle size of 50-260 nm; a suitable range of particle size is conductive to improving the microstructure and strength of the hydration product.

Silica sol: liquid, with a particle size of 7-25 nm; the particle size of silica sol has an influence on the adhesion and permeability of the colloid.

Lithium silicate: solid or liquid, with a modulus of 1.5-3.5; the modulus has an influence on the bonding performance and water solubility of the colloid; the higher the modulus, the better the bonding performance, and the harder lithium silicate is to be dissolved in water; and the solid is dissolved in water before use.

Sodium silicate: solid or liquid, with a modulus of 1.5-3.0; the modulus has an influence on the bonding performance and water solubility of the colloid; the higher the modulus, the better the bonding performance, and the harder lithium silicate is to be dissolved in water; and the solid is dissolved in water before use.

Citric acid: powder, with a purity of >95%; the higher the purity, the greater the proportion of active ingredients.

Microcrystalline cellulose: prepared from plant fibers; with a particle size of 20-80 μm; and the solid is dissolved in water before use.

Cellulose nanowhiskers: prepared from microcrystalline fibers; with a diameter of 5-20 nm and a length of 100-600 nm; liquid or solid; the solid is ultrasonically dispersed in water for 15-20 min before use.

Redispersible latex powder: powder, with a purity of >95% and a bulk density ≥450 g/L; redispersible latex powder is selected from the group consisting of ethylene-vinyl acetate copolymer, vinyl acetate-vinyl tertiary carbonate copolymer, acrylic acid copolymer, or a combination thereof; preferably, redispersible latex powder is ethylene-vinyl acetate copolymer which has better compatibility with the components of the inorganic adhesive to enhance bonding performance. The higher the purity, the greater the proportion of active ingredients, the greater the bulk density, the finer the powder, and the better the bonding performance.

Amino trimethylene phosphonic acid: powder or liquid, with a chloride ion content <1%; and the powder is dissolved in water before use.

Water: clean tap water.

In a class of this embodiment, the mass ratio of magnesium oxide to magnesium sulfate heptahydrate to silica fume to silica sol to lithium silicate to sodium silicate to citric acid to microcrystalline cellulose to cellulose nanowhiskers to redispersible latex powder to amino trimethylene phosphonic acid to water is 1:0.2-0.6:0.01-0.1:0.001-0.03:0.00002-0.02:0.002-0.03:0.002-0.03:0.002-0.03:0.0005-0.01:0-0.002:0.001-0.01:0.2-0.8.

In a class of this embodiment, the mass ratio of magnesium oxide to magnesium sulfate heptahydrate to silica fume to silica sol to lithium silicate to sodium silicate to citric acid to microcrystalline cellulose to cellulose nanowhiskers to redispersible latex powder to amino trimethylene phosphonic acid to water is 1:0.3-0.5:0.02-0.08:0.002-0.02:0.005-0.01:0.005-0.02:0.005-0.02:0.005-0.01:0.001-0.005:0.0001-0.001:0.002-0.006:0.3-0.6.

The content of silica fume is within a suitable range. Increased content of silica fume leads to increased viscosity of the slurry, improved performance of hydration products, and increased water resistance and strength of the inorganic adhesive. High levels of silica fume leads to low bonding performance, increased brittleness of products, and increased risk of cracking in bamboo.

Silica sol is used in combination with lithium silicate and sodium silicate, which improves the viscosity of the slurry, increases the permeability of the colloid, and increases the water resistance of the inorganic adhesive.

Citric acid: which changes the hydration product to form a more stable phase. The content of citric acid is critical to prepare the inorganic adhesive. Low levels of citric acid lead to less stable phase of hydration products. High levels of citric acid cause abnormal coagulation of hydration products and crack the microstructure of the matrix.

Microcrystalline cellulose is used in combination with cellulose nanowhiskers to achieve the following effects: 1. increase toughness and prevent cracking at micro-nano multi-scale; and 2. improve adhesive bonding between the bamboo materials according to the principle that microcrystalline cellulose, cellulose nanowhiskers, and bamboo materials are disposed on the same matrix.

The disclosure provides a method for preparing an inorganic adhesive for preventing cracks of bamboo products, comprising: weighing the materials according to the proportion of raw materials; adding magnesium sulfate heptahydrate to water, and stirring at 15-40° C. for complete dissolution, thereby obtaining a magnesium sulfate aqueous solution; adding microcrystalline cellulose and cellulose nanowhiskers to the magnesium sulfate aqueous solution, and stirring the mixture; adding silica sol, citric acid, lithium silicate, sodium silicate, redispersible latex powder, and amino trimethylene phosphonic acid to the mixture, and stirring; adding magnesium oxide and silica fume to the mixture, and stirring the mixture to obtain the inorganic adhesive.

In actual use, the redispersible latex powder is optionally added to the inorganic adhesive; when not in use, the redispersible latex powder is not added in the preparation method.

In a class of this embodiment, lithium silicate in a solid is dissolved in water before use, and the operation comprises: adding lithium silicate to the water in a mass ratio of from 1:2 to 1:3; and stirring the mixture with a glass stirring rod for 1-2 min until the mixture is completely dissolved; dissolving lithium silicate in water before use is conducive to exhibiting the function of lithium silicate.

In a class of this embodiment, sodium silicate in a solid is dissolved in water before use, and the operation comprises: adding sodium silicate to the water in a mass ratio of from 1:2 to 1:3; and stirring the mixture with a glass stirring rod for 1-2 min until the mixture is completely dissolved; dissolving sodium silicate in water before use is conducive to exhibiting the function of sodium silicate.

In a class of this embodiment, amino trimethylene phosphonic acid in a solid is dissolved in water before use, and the operation comprises: adding amino trimethylene phosphonic acid to the water in a mass ratio of from 1:2 to 1:3; and stirring the mixture with a glass stirring rod for 1-2 min until the mixture is completely dissolved; dissolving amino trimethylene phosphonic acid in water before use is conducive to exhibiting the function of amino trimethylene phosphonic acid.

The disclosure provides a method for preparing a bamboo scrimber with cracking resistance, the method comprising: adding magnesium sulfate heptahydrate to water, and stirring at 15-40° C. for complete dissolution, thereby obtaining a magnesium sulfate aqueous solution; adding microcrystalline cellulose and cellulose nanowhiskers to the magnesium sulfate aqueous solution, and stirring the mixture; adding silica sol, citric acid, lithium silicate, sodium silicate, redispersible latex powder (according to the specific formula, determining whether or not to add the redispersible latex powder to the mixture), and amino trimethylene phosphonic acid to the mixture, followed by thorough stirring; adding magnesium oxide and magnesium oxide to the mixture, and then thoroughly stirring the mixture to obtain an inorganic adhesive; soaking bamboo silk in the inorganic adhesive for 20-30 min; rolling the bamboo silk 1-2 times until the bamboo silk is evenly coated with the inorganic adhesive; after 20-30 minutes of soaking, placing the bamboo silk into a mold and compressing the bamboo silk with a compressive strength of 2.5-10 megapascal for shaping.

The redispersible latex powder is optionally added to the inorganic adhesive; when not use, the redispersible latex powder is not added in the preparation method.

Bamboo scrimber: after 1 day of compression, removing the pressure and the mold; placing the bamboo scrimber in a curing box with a temperature of 20±2° C. and a humidity of 65±5% to a preset age; cutting off and discarding the end area of a length of 10-20 mm of the bamboo scrimber; cutting the bamboo scrimber into a standard specimen for testing the mechanical properties of the bamboo scrimber; the size of the test piece for a bend test is 100×100×400 mm, the size for a tensile test is 15×50×350 mm, and the size for compression test is 100×100×100 mm.

The disclosure uses magnesium oxysulfide as a base material, optimizes particle size distributions, adjusts the viscosity of the slurry, and optimizes the ratio of the raw materials in the inorganic adhesive, to perform modification technologies such as nano-modification, toughing crack resistance, thereby increasing the adhesion between the inorganic adhesive and the bamboo materials and increasing the permeability of the bamboo materials to the bamboo materials. The inorganic adhesive due to ultra-high fire resistance and high strength of magnesium oxysulfide is further used to prepare a bamboo scrimber with ultra-high fire resistance and high strength.

The performance data of the inorganic adhesive is as follows:

Compressive strength: on the $7^{th}$ day, the flexural strength of the inorganic adhesive is 7-10 megapascal and the compressive strength is 45-65 megapascal; on the $28^{th}$ day, the flexural strength of the inorganic adhesive is 9-15.0 megapascal and the compressive strength is 50-85 megapascal.

The properties of the bamboo scrimber are as follows:

Treatment of bamboo silk by carbonization: on the $28^{th}$ day, the compressive strength of the bamboo scrimber parallel to grains is 45-75 megapascal, the tensile strength parallel to grans is 50-80 megapascal, and the flexural strength is 55-75 megapascal.

Treatment of bamboo silk without carbonization: on the 28th day, the compressive strength of the bamboo scrimber parallel to grains is 60-80 megapascal, the tensile strength parallel to grains is 55-90 megapascal, and the flexural strength is 60-95 megapascal.

The bamboo scrimber of the disclosure releases no harmful substances, exhibits higher strength, fire resistance and durability than that in the related art.

DETAILED DESCRIPTION

To further illustrate, embodiments detailing an inorganic adhesive for preventing cracks of bamboo products, a preparation method of the inorganic adhesive, and a preparation method of a bamboo scrimber are described below. It should be noted that the following embodiments are intended to describe and not to limit the disclosure.

Example 1

Preparation Methods of an Inorganic Adhesive and Bamboo Scrimber

The inorganic adhesive comprises magnesium oxide, magnesium sulfate heptahydrate, silica fume, silica sol, lithium silicate, sodium silicate, citric acid, microcrystalline cellulose, cellulose nanowhiskers, redispersible latex powder, amino trimethylene phosphonic acid, and water (at 35° C.).

The mass ratio of magnesium oxide to magnesium sulfate heptahydrate to silica fume to silica sol to lithium silicate to sodium silicate to citric acid to microcrystalline cellulose to cellulose nanowhiskers to redispersible latex powder to amino trimethylene phosphonic acid to water was 1:0.42:0.05:0.01:0.005:0.01:0.01:0.01:0.0002:0.0005:0.0005:0.39.

Magnesium oxide: light-burned magnesia, with an activity of 75.

Magnesium sulfate heptahydrate: industrial grade, with an effect content of 95%.

Silica fume: with amorphous form $SiO_2$ content of 96% and a particle size of 50-200 nm.

Silica sol: liquid, with a particle size of 10-20 nm and a concentration of 30%.

Lithium silicate: solid, with a modulus of 2.0; and dissolved in water before use.

Sodium silicate: liquid, with a modulus of 2.4.

Citric acid: powder, with a purity of 99%.

Microcrystalline cellulose: solid; prepared from plant fibers; with a particle size of 20-40 μm; and dissolved in water before use.

Cellulose nanowhiskers: prepared from microcrystalline fibers; with a diameter of 8-15 nm and a length of 200-300 nm; solid; and ultrasonically dispersed in water for 15 min before use.

Redispersible latex powder: powder, with a purity of 99% and a bulk density 550 g/L.

Amino trimethylene phosphonic acid: liquid, with a chloride ion content of 0.5%.

Water: clean tap water.

A method for preparing an inorganic adhesive is detailed as follows:

lithium silicate was added to the water in a mass ratio of 1:2.5 and stirred with a glass stirring rod for 1-2 min until the mixture is completely dissolved; dissolving lithium silicate in water before use was conducive to exhibiting the function of lithium silicate;

the materials were weighted according to the proportion of raw materials; magnesium sulfate heptahydrate was added to the water at 15-40° C. and stirred for complete dissolution, thereby obtaining a magnesium sulfate aqueous solution; microcrystalline cellulose and cellulose nanowhiskers were added to the magnesium sulfate aqueous solution, thoroughly stirred, followed by addition of silica sol, citric acid, lithium silicate, sodium silicate, redispersible latex powder, and amino trimethylene phosphonic acid; the mixture was thoroughly stirred, followed by addition of magnesium oxide and silica fume, and thoroughly stirred to obtain an inorganic adhesive.

Performance of the Inorganic Adhesive:

1. Testing for Compressive Strength and Flexural Strength.

Test method: the inorganic adhesive was poured into a mold of 40×40×160 mm, allowed to stand at room temperature 20±5° C. and with a humidity 70±5%; the surface of the mold was covered with plastic wrap; after one day, the mold was removed and the bamboo scrimber was placed at a temperature of 20±2° C. and with a humidity of 65±5% to a preset age; and then the compressive strength and flexural strength of the bamboo scrimber was measured.

The performance data of the inorganic adhesive: on the 7th day, the flexural strength of the inorganic adhesive was 9 megapascal and the compressive strength was 58 megapascal; on the 28th day, the flexural strength of the inorganic adhesive was 15.0 megapascal and the compressive strength was 68.0 megapascal.

Preparation of Bamboo Scrimber and Mechanical Properties Thereof:

A method for preparing bamboo scrimber with uncarbonized bamboo silk:

the materials were weighted according to the proportion of raw materials; magnesium sulfate heptahydrate was added to the water at 35° C. and stirred for complete dissolution, thereby obtaining a magnesium sulfate aqueous solution; microcrystalline cellulose and cellulose nanowhiskers were added to the magnesium sulfate aqueous solution, thoroughly stirred, followed by addition of silica sol, citric acid, lithium silicate, sodium silicate, redispersible latex powder, and amino trimethylene phosphonic acid; the mixture was thoroughly stirred, followed by addition of magnesium oxide and silica fume, and thoroughly stirred to obtain an inorganic adhesive; the bamboo silk was soaked in the inorganic adhesive; the bamboo silk was rolled 2 times until the bamboo silk was evenly coated with the inorganic adhesive; after 25 minutes of soaking, the bamboo silk was put into a mold and compressed with a compressive strength of 5.0 megapascal.

After 1 day of compression, the pressure and the mold were removed; the bamboo scrimber was placed in a curing box with a temperature of 20±2° C. and a humidity of 65±5% to a preset age; the end area with a length of 10-20 mm was cut off and discarded; the bamboo scrimber was cut into a standard specimen for testing the mechanical properties of the bamboo scrimber; the size of the test piece for a bend test was 100×100×400 mm, the size for a tensile test was 15×50×350 mm, and the size for compression test was 100×100×100 mm.

Test method: the standard specimens are subjected to performance tests such as tension, compression, and bending.

On the 28th day, the compressive strength of the bamboo scrimber parallel to grains was 65 megapascal, the tensile strength parallel to grains was 75 megapascal, and the flexural strength was 90 megapascal.

Example 2

Preparation Methods of an Inorganic Adhesive and Bamboo Scrimber

The inorganic adhesive comprises magnesium oxide, magnesium sulfate heptahydrate, silica fume, silica sol, lithium silicate, sodium silicate, citric acid, microcrystalline cellulose, cellulose nanowhiskers, redispersible latex powder, amino trimethylene phosphonic acid, and water (at 35° C.).

The mass ratio of magnesium oxide to magnesium sulfate heptahydrate to silica fume to silica sol to lithium silicate to sodium silicate to citric acid to microcrystalline cellulose to cellulose nanowhiskers to redispersible latex powder to amino trimethylene phosphonic acid to water was 1:0.38:0.07:0.005:0.005:0.005:0.015:0.005:0.001:0.0001:0.002:0.53.

Magnesium oxide: light-burned magnesia, with an activity of 60.

Magnesium sulfate heptahydrate: industrial grade, with an effect content of 90%.

Silica fume: with $SiO_2$ content of 93% and a particle size of 100-250 nm.

Silica sol: liquid, with a particle size of 15-25 nm and a concentration of 30%.

Lithium silicate: solid, with a modulus of 1.5; and dissolved in water before use.

Sodium silicate: solid, with a modulus of 1.5; and dissolved in water before use.

Citric acid: powder, with a purity of 95%.

Microcrystalline cellulose: solid; prepared from plant fibers; with a particle size of 60-80 μm; and dissolved in water before use.

Cellulose nanowhiskers: prepared from microcrystalline fibers; with a diameter of 15-20 nm and a length of 100-200 nm; solid; and ultrasonically dispersed in water for 15 min before use.

Redispersible latex powder: powder, with a purity of 96% and a bulk density 450 g/L.

Amino trimethylene phosphonic acid: liquid, with a chloride ion content of 0.6%.

Water: clean tap water.

A method for preparing an inorganic adhesive comprises:
lithium silicate was added to the water in a mass ratio of 1:3 and stirred with a glass stirring rod for 1-2 min until the mixture is completely dissolved; dissolving lithium silicate in water before use is conducive to exhibiting the function of lithium silicate;
sodium silicate was added to the water in a mass ratio of 1:2 and stirred with a glass stirring rod for 1-2 min until the mixture is completely dissolved; dissolving sodium silicate in water before use is conducive to exhibiting the function of sodium silicate;
amino trimethylene phosphonic acid in a solid was dissolved in water before use, comprising: amino trimethylene phosphonic acid was added to the water in a mass ratio of 1:2, and stirred with a glass stirring rod for 1-2 min until the mixture is completely dissolved; dissolving amino trimethylene phosphonic acid in water before use is conducive to exhibiting the function of amino trimethylene phosphonic acid.
the materials were weighted according to the proportion of raw materials; magnesium sulfate heptahydrate was added to the water at 15-40° C. and stirred for complete dissolution, thereby obtaining a magnesium sulfate aqueous solution; microcrystalline cellulose and cellulose nanowhiskers were added to the magnesium sulfate aqueous solution, thoroughly stirred, followed by addition of silica sol, citric acid, lithium silicate, sodium silicate, redispersible latex powder, and amino trimethylene phosphonic acid; the mixture was thoroughly stirred, followed by addition of magnesium oxide and silica fume, and thoroughly stirred to obtain an inorganic adhesive.

Performance of the Inorganic Adhesive:

1. Testing for Compressive Strength and Flexural Strength.

Test method: the inorganic adhesive was poured into a mold of 40×40×160 mm, allowed to stand at room temperature 20±5° C. and with a humidity 70±5%; the surface of the mold was covered with plastic wrap; after one day, the mold was removed and the bamboo scrimber was placed at a temperature of 20±2° C. and with a humidity of 65±5% to a preset age; and then the compressive strength and flexural strength of the bamboo scrimber was measured.

The performance data of the inorganic adhesive: on the $7^{th}$ day, the flexural strength of the inorganic adhesive was 7.5 megapascal and the compressive strength was 48 megapascal; on the $28^{th}$ day, the flexural strength of the inorganic adhesive was 9.5 megapascal and the compressive strength was 56.0 megapascal.

Preparation of Bamboo Scrimber and Mechanical Properties Thereof:

A method for preparing bamboo scrimber with uncarbonized bamboo silk:
the materials were weighted according to the proportion of raw materials; magnesium sulfate heptahydrate was added to the water at 30° C. and stirred for complete dissolution, thereby obtaining a magnesium sulfate aqueous solution; microcrystalline cellulose and cellulose nanowhiskers were added to the magnesium sulfate aqueous solution, thoroughly stirred, followed by addition of silica sol, citric acid, lithium silicate, sodium silicate, redispersible latex powder, and amino trimethylene phosphonic acid; the mixture was thoroughly stirred, followed by addition of magnesium oxide and silica fume, and thoroughly stirred to obtain an inorganic adhesive; the bamboo silk was soaked in the inorganic adhesive; the bamboo silk was rolled 1 time until the bamboo silk was evenly coated with the inorganic adhesive; after 20 minutes of soaking, the bamboo silk was put into a mold and compressed with a compressive strength of 2.5 megapascal.

After 1 day of compression, the pressure and the mold were removed; the bamboo scrimber was placed in a curing box with a temperature of 20±2° C. and a humidity of 65±5% to a preset age; the end area with a length of 10-20 mm was cut off and discarded; the bamboo scrimber was cut into a standard specimen for testing the mechanical properties of the bamboo scrimber; the size of the test piece for a bend test was 100×100×400 mm, the size for a tensile test was 15×50×350 mm, and the size for compression test was 100×100×100 mm.

Test method: the standard specimens are subjected to performance tests such as tension, compression, and bending.

On the $28^{th}$ day, the compressive strength of the bamboo scrimber parallel to grains was 48 megapascal, the tensile strength parallel to grains was 56 megapascal, and the flexural strength was 60 megapascal.

Example 3

Preparation Methods of an Inorganic Adhesive and Bamboo Scrimber

The inorganic adhesive comprises magnesium oxide, magnesium sulfate heptahydrate, silica fume, silica sol, lithium silicate, sodium silicate, citric acid, microcrystalline cellulose, cellulose nanowhiskers, amino trimethylene phosphonic acid, and water (at 35° C.).

The mass ratio of magnesium oxide to magnesium sulfate heptahydrate to silica fume to silica sol to lithium silicate to sodium silicate to citric acid to microcrystalline cellulose to cellulose nanowhiskers to amino trimethylene phosphonic acid to water was 1:0.35:0.05:0.003:0.003:0.005:0.015:0.005:0.001:0.002:0.52.

Magnesium oxide: light-burned magnesia, with an activity of 59.

Magnesium sulfate heptahydrate: industrial grade, with an effect content of 90%.

Silica fume: with amorphous $SiO_2$ content of 95% and a particle size of 100-250 nm.

Silica sol: liquid, with a particle size of 15-25 nm and a concentration of 30%.

Lithium silicate: solid, with a modulus of 1.5; and dissolved in water before use.

Sodium silicate: solid, with a modulus of 1.5; and dissolved in water before use.

Citric acid: powder, with a purity of 95%.

Microcrystalline cellulose: solid; prepared from plant fibers; with a particle size of 60-80 μm; and dissolved in water before use.

Cellulose nanowhiskers: prepared from microcrystalline fibers; with a diameter of 15-20 nm and a length of 100-200 nm; solid; and ultrasonically dispersed in water for 15 min before use.

Amino trimethylene phosphonic acid: liquid, with a chloride ion content of 0.6%.

Water: clean tap water.

A method for preparing an inorganic adhesive comprises:
lithium silicate was added to the water in a mass ratio of 1:3 and stirred with a glass stirring rod for 1-2 min until the mixture is completely dissolved; dissolving lithium silicate in water before use is conducive to exhibiting the function of lithium silicate;
sodium silicate was added to the water in a mass ratio of 1:2 and stirred with a glass stirring rod for 1-2 min until the mixture is completely dissolved; dissolving sodium silicate in water before use is conducive to exhibiting the function of sodium silicate;
amino trimethylene phosphonic acid in a solid was dissolved in water before use, comprising: amino trimethylene phosphonic acid was added to the water in a mass ratio of 1:2, and stirred with a glass stirring rod for 1-2 min until the mixture is completely dissolved; dissolving amino trimethylene phosphonic acid in water before use is conducive to exhibiting the function of amino trimethylene phosphonic acid.
the materials were weighted according to the proportion of raw materials; magnesium sulfate heptahydrate was added to the water at 15-40° C. and stirred for complete dissolution, thereby obtaining a magnesium sulfate aqueous solution; microcrystalline cellulose and cellulose nanowhiskers were added to the magnesium sulfate aqueous solution, thoroughly stirred, followed by addition of silica sol, citric acid, lithium silicate, sodium silicate, and amino trimethylene phosphonic acid; the mixture was thoroughly stirred, followed by addition of magnesium oxide and silica fume, and thoroughly stirred to obtain an inorganic adhesive.

Performance of the Inorganic Adhesive:

1. Testing for Compressive Strength and Flexural Strength.

Test method: the inorganic adhesive was poured into a mold of 40×40×160 mm, allowed to stand at room temperature 20±5° C. and with a humidity 70±5%; the surface of the mold was covered with plastic wrap; after one day, the mold was removed and the bamboo scrimber was placed at a temperature of 20±2° C. and with a humidity of 65±5% to a preset age; and then the compressive strength and flexural strength of the bamboo scrimber was measured.

The performance data of the inorganic adhesive: on the $7^{th}$ day, the flexural strength of the inorganic adhesive was 7.1 megapascal and the compressive strength was 49 megapascal; on the $28^{th}$ day, the flexural strength of the inorganic adhesive was 9.2 megapascal and the compressive strength was 60 megapascal.

Preparation of Bamboo Scrimber and Mechanical Properties Thereof:

A method for preparing bamboo scrimber with uncarbonized bamboo silk:

the materials were weighted according to the proportion of raw materials; magnesium sulfate heptahydrate was added to the water at 25° C. and stirred for complete dissolution, thereby obtaining a magnesium sulfate aqueous solution; microcrystalline cellulose and cellulose nanowhiskers were added to the magnesium sulfate aqueous solution, thoroughly stirred, followed by addition of silica sol, citric acid, lithium silicate, sodium silicate, and amino trimethylene phosphonic acid; the mixture was thoroughly stirred, followed by addition of magnesium oxide and silica fume, and thoroughly stirred to obtain an inorganic adhesive; the bamboo silk was soaked in the inorganic adhesive; the bamboo silk was rolled twice until the bamboo silk was evenly coated with the inorganic adhesive; after 30 minutes of soaking, the bamboo silk was put into a mold and compressed with a compressive strength of 10 megapascal.

After 1 day of compression, the pressure and the mold were removed; the bamboo scrimber was placed in a curing box with a temperature of 20±2° C. and a humidity of 65±5% to a preset age; the end area with a length of 10-20 mm was cut off and discarded; the bamboo scrimber was cut into a standard specimen for testing the mechanical properties of the bamboo scrimber; the size of the test piece for a bend test was 100×100×400 mm, the size for a tensile test was 15×50×350 mm, and the size for compression test was 100×100×100 mm.

Test method: the standard specimens are subjected to performance tests such as tension, compression, and bending.

On the $28^{th}$ day, the compressive strength of the bamboo scrimber parallel to grains was 50 megapascal, the tensile strength parallel to grains was 60 megapascal, and the flexural strength was 62 megapascal.

It will be obvious to those skilled in the art that changes and modifications may be made, and therefore, the aim in the appended claims is to cover all such changes and modifications.

What is claimed is:

1. An inorganic adhesive, comprising: magnesium oxide, magnesium sulfate heptahydrate, silica sol, lithium silicate, sodium silicate, citric acid, microcrystalline cellulose, cellulose nanowhiskers, amino trimethylene phosphonic acid, and water.

2. The inorganic adhesive of claim 1, wherein the inorganic adhesive further comprises redispersible latex powder and silica fume.

3. The inorganic adhesive of claim 2, wherein a mass ratio of magnesium oxide to magnesium sulfate heptahydrate to silica fume to silica sol to lithium silicate to sodium silicate to citric acid to microcrystalline cellulose to cellulose nanowhiskers to redispersible latex powder to amino trimethylene phosphonic acid to water is 1:0.2-0.6:0.01-0.1:0.001-0.03:0.00002-0.02:0.002-0.03:0.002-0.03:0.002-0.03:0.0005-0.01:0-0.002:0.001-0.01:0.2-0.8.

4. The inorganic adhesive of claim 3, wherein a mass ratio of magnesium oxide to magnesium sulfate heptahydrate to silica fume to silica sol to lithium silicate to sodium silicate to citric acid to microcrystalline cellulose to cellulose nanowhiskers to redispersible latex powder to amino trimethylene phosphonic acid to water is 1:0.3-0.5:0.02-0.08:0.002-0.02:0.005-0.01:0.005-0.02:0.005-0.02:0.005-0.01:0.001-0.005:0.0001-0.001:0.002-0.006:0.3-0.6.

5. The inorganic adhesive of claim 1, wherein magnesium oxide is light-burned magnesia, with an activity of 58 or above; magnesium sulfate heptahydrate is in an industrial grade, with an effect content of ≥90%; and silica fume has a $SiO_2$ content >90%, and a particle size of 50-260 nm.

6. The inorganic adhesive of claim 1, wherein the silica sol is a liquid, with a particle size of 7-25 nm; lithium silicate is a solid or a liquid, with a modulus of 1.5-3.5, and the solid is dissolved in water before use; sodium silicate is a solid or a liquid, with a modulus of 1.5-3.0, and the solid is dissolved in water before use.

7. The inorganic adhesive of claim 1, wherein citric acid is powder, with a purity of >95%.

8. The inorganic adhesive of claim 1, wherein the microcrystalline cellulose is prepared from plant fibers, with a particle size of 20-80 μm; the cellulose nanowhiskers are prepared from microcrystalline fibers, with a diameter of 5-20 nm and a length of 100-600 nm; liquid or solid; the solid is ultrasonically dispersed in water for 15-20 min before use.

9. The inorganic adhesive of claim 1, wherein the redispersible latex powder has a purity of >95% and a bulk density ≥450 g/L; and the redispersible latex powder is selected from the group consisting of ethylene-vinyl acetate copolymer, vinyl acetate-vinyl tertiary carbonate copolymer, acrylic acid copolymer, and a combination thereof.

10. The inorganic adhesive of claim 9, wherein the redispersible latex powder is ethylene-vinyl acetate copolymer.

11. The inorganic adhesive of claim 1, wherein amino trimethylene phosphonic acid is powder or liquid, with a chloride ion content <1%.

* * * * *